(12) United States Patent
Haught

(10) Patent No.: US 7,232,183 B1
(45) Date of Patent: Jun. 19, 2007

(54) COMFORT ZONE GOLF CART PAD

(76) Inventor: Gloria Haught, 8909 85th St., Largo, FL (US) 33777

( * ) Notice: Subject to any disclaimer, the term of this patent is extended or adjusted under 35 U.S.C. 154(b) by 86 days.

(21) Appl. No.: 11/141,740

(22) Filed: May 31, 2005

(51) Int. Cl.
*A47C 31/00* (2006.01)
(52) U.S. Cl. ........................................ 297/219.1; 5/653
(58) Field of Classification Search ............. 297/183.9, 297/211.1, 251, 252, 250.1; 5/653, 654
See application file for complete search history.

(56) References Cited

U.S. PATENT DOCUMENTS

| | | | |
|---|---|---|---|
| 4,266,707 A | * | 5/1981 | Rossman .................... 224/275 |
| 4,729,599 A | * | 3/1988 | Nissen ..................... 297/219.1 |
| D437,170 S | | 2/2001 | Atwell |
| 6,254,182 B1 | | 7/2001 | Townsend |
| 6,273,504 B1 | * | 8/2001 | Pace et al. ................ 297/219.1 |
| D484,351 S | | 12/2003 | Bridge |
| 6,974,191 B2 | * | 12/2005 | Serhan ................... 297/440.24 |

* cited by examiner

*Primary Examiner*—Peter R. Brown

(57) ABSTRACT

A padded seat for use with golf carts. The padded seat is preferably rectangularly shaped and has a pair of holes on each end to allow for placement of the padded seat over the seat and arms of the cart.

7 Claims, 1 Drawing Sheet

COMFORT ZONE GOLF CART PAD

I. BACKGROUND OF THE INVENTION

The present invention concerns that of a new and improved padded seat for use with golf carts.

II. DESCRIPTION OF THE PRIOR ART

U.S. Pat. No. 6,254,182, issued to Townsend, discloses a rectangular breathable cloth golf cart seat cover with side handle receiving slots and a center elastic fastening loop.

U.S. Pat. No. D484,351, issued to Bridge, discloses an ornamental design for a golf cart seat cover.

U.S. Pat. No. D437,170, issued to Atwell, discloses an ornamental design for a golf cart seat back cover.

III. SUMMARY OF THE INVENTION

The present invention concerns that of a new and improved padded seat for use with golf carts. The padded seat is preferably rectangularly shaped and has a pair of holes on each end to allow for placement of the padded seat over the arms of the cart.

There has thus been outlined, rather broadly, the more important features of a padded seat for use with golf carts that the detailed description thereof that follows may be better understood and in order that the present contribution to the art may be better appreciated. There are, of course, additional features of the padded seat for use with golf carts that will be described hereinafter and which will form the subject matter of the claims appended hereto.

In this respect, before explaining at least one embodiment of the padded seat for use with golf carts in detail, it is to be understood that the padded seat for use with golf carts is not limited in its application to the details of construction and to the arrangements of the components set forth in the following description or illustrated in the drawings. The padded seat for use with golf carts is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present padded seat for use with golf carts. It is important, therefore, that the claims be regarded as including such equivalent constructions insofar as they do not depart from the spirit and scope of the present invention.

It is therefore an object of the present invention to provide a padded seat for use with golf carts which has all of the advantages of the prior art and none of the disadvantages.

It is another object of the present invention to provide a padded seat for use with golf carts which may be easily and efficiently manufactured and marketed.

It is another object of the present invention to provide a padded seat for use with golf carts which is of durable and reliable construction.

It is yet another object of the present invention to provide a padded seat for use with golf carts which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
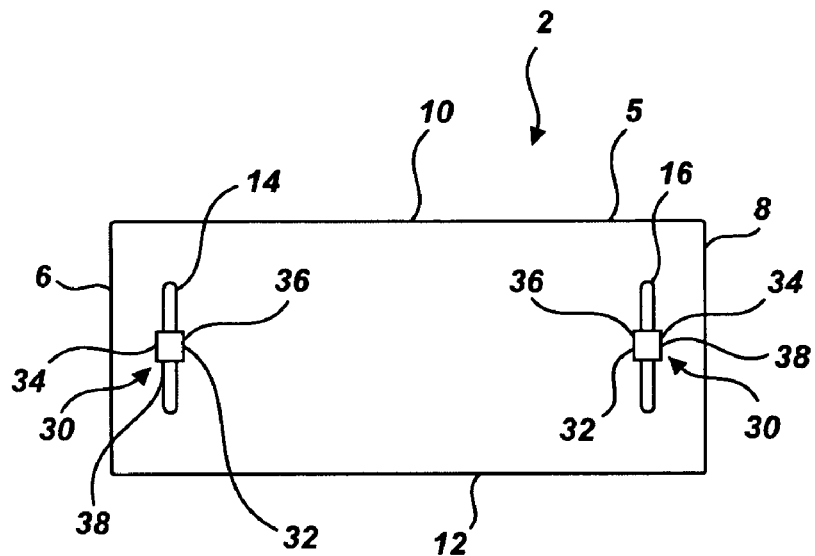
FIG. 1 shows a top view of the padded seat for use with golf carts.
Figure 2:
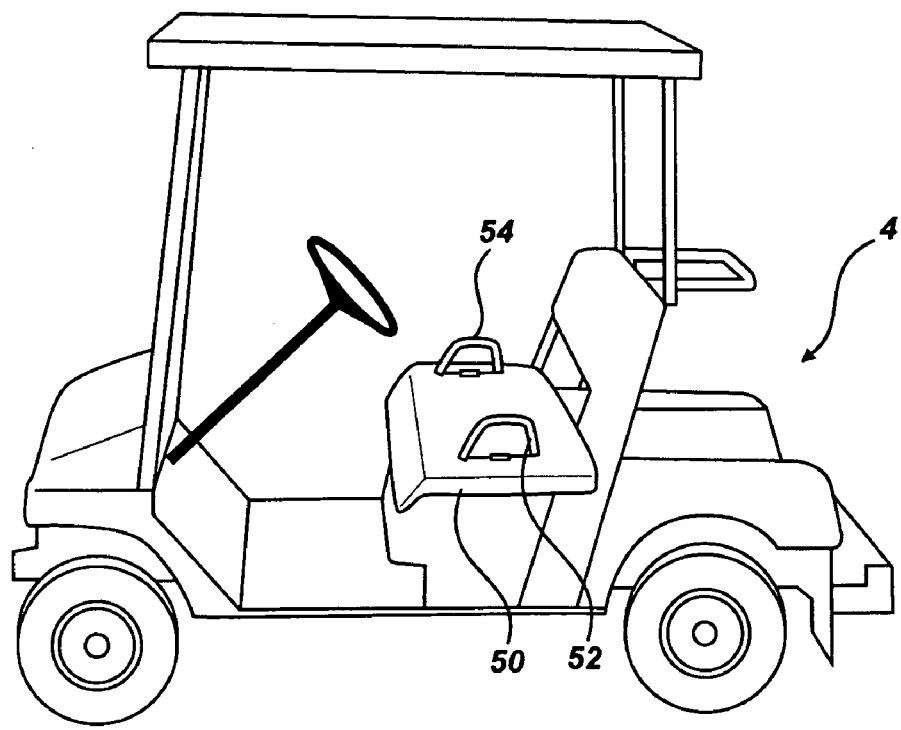
FIG. 2 shows a perspective view of the padded seat for use with golf carts as it would appear in use with a golf cart.

FIG. 1 shows a top view of the padded seat 2 for use with golf carts, while FIG. 2 shows a perspective view of the padded seat 2 for use with golf carts as it would appear in use with a golf cart 4.

Padded seat 2 comprises a piece of fabric 5 that has two ends, a first end 6 and a second end 8, and furthermore, has two sides comprising a first side 10 and a second side 12. The piece of fabric 5 can be either square or rectangular but it is preferred that it is rectangular in nature.

Padded seat 2 comprises two openings 14 and 16, with opening 14 being located near the first end 6 of the padded seat 2 and opening 16 being located near the second end 8 of the padded seat 2. Each opening runs parallel to the end surfaces and perpendicular to the sides of the padded seat 2. The openings can have a varied length, but preferably each have a length of seventeen (17) inches. Each opening has two ends, a first end and a second end, and also has two sides, an inner side and an outer side.

Each opening also has a closure means 30 which allows the opening to be tightly controlled after it has been placed over a handle on a golf cart. Closure means 30 preferably comprises a first patch 32 and a second patch 34. The first patch 32 is attached to the inner side of each opening, while the second patch 34 is attached to the outer side of each opening. The first patch 32 has a plurality of attachment objects 36 attached to it, while the second patch 34 has a plurality of attachment objects 38 attached to it. Between the two pluralities of attachment objects, one of the plurality of attachment objects is a plurality of loops and the other plurality of attachment objects is a plurality of hooks. When one of the patches of a pair of patches is placed against the other patch of the same pair of patches, then the two patches become removably attached to one another.

Within each pair of patches, one of the patches is attached to the padded seat near an opening on one side of the opening, while the other patch is attached to the padded seat near the same opening on the other side of the opening. This positioning causes the two patches, when connected to one another, to pull the respective opening somewhat shut.

FIG. 2 shows a perspective view of the padded seat 2 for use with golf carts as it would appear in use with a golf cart 4. The padded seat 2 has been placed over the golf cart seat 50, with the golf cart seat 50 having two handles, a left handle 52 and a right handle 54. The openings 14 and 16 have been placed over the left handle 52 and the right handle 54, respectively, thereby helping to keep the padded seat 2 in place on the golf cart seat 50.

What I claim as my invention is:

1. A padded seat for use with golf carts in combination with a golf cart, the golf cart including a seat, the golf cart also including a pair of handles comprising a first handle and a second handle, the padded seat comprising:

a piece of fabric having a first end, a second end, a first side, and a second side, a pair of openings comprising a first opening and a second opening, each opening having a first end, a second end, a first side, and a second side, the first opening being located near the first end of the padded seat, the second opening being located near the second end of the padded seat, means for reducing the size or closing each opening, wherein the piece of fabric is placed over the seat of the golf cart, further wherein each of the openings of the piece of fabric is placed over a handle of the golf cart, wherein each opening runs parallel to the end surfaces and perpendicular to the sides of the padded seat, wherein each opening has a length of seventeen (17) inches.

2. A padded seat for use with golf carts in combination with a golf cart according to claim 1 wherein the means for reducing the size or closing each opening further comprises:

two pairs of patches, each pair of patches comprising a first patch and a second patch, the first patch of each pair of patches attached to the inner side of an opening, the second patch of each pair of patches attached to the outer side of an opening, a first plurality of attachment objects attached to each first patch, a second plurality of attachment objects attached to each second patch, wherein between the two pluralities of attachment objects, one of the plurality of attachment objects is a plurality of loops and the other plurality of attachment objects is a plurality of hooks, further wherein when one of the patches of a pair of patches is placed against the other patch of the same pair of patches, then the two patches become removable attached to one another.

3. A padded seat for use with golf carts in combination with a golf cart, the golf cart including a seat, the golf cart also including a pair of handles comprising a first handle and a second handle, the padded seat comprising:

a piece of fabric having a first end, a second end, a first side, and a second side, a pair of openings comprising a first opening and a second opening, each opening having a first end, a second end, a first side, and a second side, the first opening being located near the first end of the padded seat, the second opening being located near the second end of the padded seat, the first opening and the second opening being closed such that the first opening and the second opening are free from intersection with the first end, the second end, the first side, and the second side of the piece of fabric, wherein the piece of fabric is placed over the seat of the golf cart, further wherein each of the openings of the piece of fabric is placed over a handle of the golf cart.

4. The padded seat of claim 3 and further comprising:

means for reducing the size or closing each opening.

5. The padded seat of claim 3 wherein each opening runs parallel to the end surfaces and perpendicular to the sides of the padded seat.

6. The padded seat of claim 3 wherein each opening has a length of seventeen (17) inches.

7. The padded seat of claim 3 wherein the means for reducing the size or closing each opening further comprises:

two pairs of patches, each pair of patches comprising a first patch and a second patch, the first patch of each pair of patches attached to the inner side of an opening, the second patch of each pair of patches attached to the outer side of an opening, a first plurality of attachment objects attached to each first patch, a second plurality of attachment objects attached to each second patch, wherein between the two pluralities of attachment objects, one of the plurality of attachment objects is a plurality of loops and the other plurality of attachment objects is a plurality of hooks, further wherein when one of the patches of a pair of patches is placed against the other patch of the same pair of patches, then the two patches become removable attached to one another.

* * * * *